United States Patent
Guyot et al.

(10) Patent No.: US 7,231,205 B2
(45) Date of Patent: Jun. 12, 2007

(54) METHOD FOR CHANGING GRAPHICAL DATA LIKE AVATARS BY MOBILE TELECOMMUNICATION TERMINALS

(75) Inventors: Oliver Guyot, St. Maur des fonés (FR); Patrick Legrand, Epinay-sur-Orge (FR); Christine Viger, Elancourt (FR); Jean-Philippe Guillemant, Le Mesnil-Saint-Denis (FR); Philippe Goldstein, Scallay (FR); Maxime Ducros, Paris (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 126 days.

(21) Appl. No.: 10/484,534

(22) PCT Filed: Jul. 19, 2002
(Under 37 CFR 1.47)

(86) PCT No.: PCT/SE02/01398

§ 371 (c)(1),
(2), (4) Date: Feb. 18, 2005

(87) PCT Pub. No.: WO03/010986

PCT Pub. Date: Feb. 6, 2003

(65) Prior Publication Data

US 2006/0046699 A1   Mar. 2, 2006

(30) Foreign Application Priority Data

Jul. 26, 2001  (SE) .................................. 0102612

(51) Int. Cl.
*H04M 3/42* (2006.01)
*H04Q 7/22* (2006.01)
*H04Q 7/38* (2006.01)

(52) U.S. Cl. .............................. 455/414.1; 455/412.1; 455/414.4; 455/416; 455/466; 455/550.1; 455/556.1; 455/556.2

(58) Field of Classification Search ............. 455/412.1, 455/414.1, 414.4, 416, 466, 550.1, 556.1, 455/556.2; 370/312, 314, 336, 494, 495
See application file for complete search history.

(56) References Cited

U.S. PATENT DOCUMENTS

| 5,847,752 | A | * | 12/1998 | Sebestyen | ................ | 348/14.12 |
| 5,880,731 | A | * | 3/1999 | Liles et al. | ................. | 715/758 |
| 6,282,182 | B1 | * | 8/2001 | Pecen et al. | ................ | 370/336 |

(Continued)

Primary Examiner—Steve M. D'Agosta

(57) ABSTRACT

The present invention relates to a mobile telecommunication terminal (1) comprising display means (6), loudspeaker and microphone means and means for communication with other mobile or non-mobile communication terminals over a first connection supporting communication of speech. Said mobile telecommunication terminal (1) further supports transmission to, and representation of, proprietary customized visual/graphical data information $1_{AO}$, e.g. avatars, on other communication terminals (2), as well as representation on the display means (6) of such customized visual/graphical information from said other communication terminal(s) (2). The proprietary customized visual/graphical data information can be altered, the telecommunication unit (1) comprising control means for altering the proprietary customized visual/graphical information, and the proprietary customized visual/graphical information can be altered or updated during an ongoing speech connection with one more of said other communication terminals over said first connection. The invention also related to a system and a method supporting such a functionality.

18 Claims, 6 Drawing Sheets

U.S. PATENT DOCUMENTS

| | | | |
|---|---|---|---|
| 6,847,821 B1 * | 1/2005 | Lewis et al. | 455/452.2 |
| 6,975,988 B1 * | 12/2005 | Roth et al. | 704/260 |
| 6,987,514 B1 * | 1/2006 | Beresin et al. | 345/473 |
| 2002/0072897 A1 * | 6/2002 | Skonberg et al. | 704/201 |
| 2002/0147926 A1 * | 10/2002 | Pecen et al. | 713/201 |
| 2003/0107529 A1 * | 6/2003 | Hayhurst et al. | 345/1.1 |

* cited by examiner

METHOD FOR CHANGING GRAPHICAL DATA LIKE AVATARS BY MOBILE TELECOMMUNICATION TERMINALS

FIELD OF THE INVENTION

The present invention relates to a mobile telecommunication terminal with display means, loudspeaker and microphone means, means for communication with other terminals over a first connection supporting communication of speech, which terminal supports communication and representation of proprietary customized graphical data information, most particularly so called avatars, to other terminals, as well as presentation of such customized graphical data information from other terminals. The invention also relates to a system and a method supporting such a functionality.

STATE OF THE ART

Through the introduction of global data communication networks, particularly with the introduction and development of Internet, it has become possible to, in a flexible way, communicate and distribute virtual information. It has become possible to meet, "play", work and exchange information in a virtual environment instead of in a real environment. It has also been found attractive to communicate using so called avatars. An avatar is a graphical icon which represents a real person in a virtual reality system. By means of a communication system, it is possible to communicate by sending avatar information. In other terms an avatar is a character which can be controlled by the end user to move around in a virtual reality and communicate and/or interact in the common context of the virtual world. The virtual reality can in principle be generated by any appropriate graphical code, for example Virtual Reality Modelling Language (VRML).

In principle the end user can select any kind of avatar, such as a fish, any other animal, a cartoon, a three-dimensional picture, e.g. of the user himself, or any other graphical illustration. To the other members of the virtual world, an avatar is the graphical representation of the "user", i.e. the graphical character the user wants to be represented through. The avatar is sent into the virtual reality when the end user controlling the avatar logs on to the virtual reality.

One particular example of an avatar is a so called talking head, which is a three-dimensional representation of a person's head, which can move its lips in synchronization with speech. Such talking heads can be used to create an illusion of a visual interconnection even if the connection that is used actually is a speech channel. In for example "Shared Spaces", British Telecommunications Engineering, vol. 15, July 1996, avatars that can be used in telephone networks are described. See of also GSM 01.02 "Digital cellular telecommunication system (Phase 2+); General description of a GSM Public Land Mobile Network (PLMN)", European Telecommunications Standards Institute (ETSI), 1996, GSM 02.17 (prETS 300 922).

WO 99/64976, "Method and device for storing and transmitting avatar information for use in a virtual environment", discusses the problem of making the technique suitable for access of a virtual world from different access terminals. As a user logs on to the virtual reality, information about the avatar has to be sent from the access terminal to the virtual reality to make the avatar appear in the virtual reality. It is known to store the avatar information in a memory in the access terminal, such that upon log on to the virtual world, information about the avatar is fetched from the storing means of the access terminal and transmitted to the virtual world. This means that the virtual reality only can be accessed from the terminal in which the avatar information actually is stored. However, through the above mentioned patent application, it gets possible to access a virtual world also from other terminals. The solution consists in adding a new memory function to a removable memory card, for example a Subscriber Identity Module (SIM) or a smart card, and in integrating the information about the avatar in the card. This means that the avatar information can be moved from one access terminal to another and it gets possible to access the virtual reality from many different access terminals supporting insertion of for example the "modified" SIM-card and by entering a personal identity number code. Particularly this makes it possible to use avatars in new applications such as in GSM telephones or other mobile terminals. The content of this patent application is herewith incorporated herein by a reference.

However, the graphical representation, particularly the avatars, is/are fixed, and moreover there is no illustration of how it will be possible to combine the use of avatars with mobile communication terminals, particularly mobile telephones. Until now there is still no such product available on the market, and the main reason therefore is that it is not feasible technically, for example with the existing WAP standard.

Mobile videoconferencing is known, but this is a different kind of service, and directed to specific user groups, and moreover it is bandwidth sensible.

Moreover a so called Disney-I-service is proposed by I-mode from NTT DoCoMo according to which it is possible to download a favourite Disney™ character—"Character town". The ringing tone will become the familiar Disney tune "Melody Palace". It is also possible to get the latest Disney information Character Town\100/Month, Melody Palace\100/month, from August 2000. However, this is a specific product and it does not allow for real mobile customization.

SUMMARY OF THE INVENTION

It is therefore an object of the present invention to provide a mobile telecommunication terminal as initially referred to through which it is possible to send visual/graphical data information into a virtual reality, and of course also to receive and represent such information from other users to the end user of the terminal. Particularly a mobile telecommunication terminal is needed which allows alteration and modification of information in a virtual environment in communication with other end users, e.g. by means of avatars, in a flexible manner. Particularly a telecommunication terminal solution, as well as a system and a method, are needed for providing entry into a virtual reality, which is user friendly, attractive for young end users and which allows several users to be connected at the same time. The solution should also be appealing to end users in that the character attitude mode of the avatar, e.g. the avatar moods, can be changed on command by the end user. A solution which allows for end user customization and flexibility in combination with mobile access is also needed.

Therefore a mobile telecommunication terminal as initially referred to is provided in which the customized visual/graphical data information can be altered, whereby the telecommunication terminal comprises control means for altering the proprietary customized visual/graphical data information. Furthermore the proprietary customized visual/graphical information can be altered or updated during an ongoing speech conversation, over a first connection. It is possible to have a speech and graphical data information connection with one or more of said other communication terminals. Particularly the mobile telecommunication terminal supports simultaneous communication of speech and data, and most particularly it is a GPRS class A terminal. In one implementation the customized visual/graphical information comprises an avatar, and a number of customized or predefined different avatar attitude modes can be selected by the user of the telecommunication terminal. In one implementation the avatar or the avatar attitude modes are fetched from Internet. Alternatively, or in addition, an application may be used which allows for end user creation of at least graphical information, e.g. relating to avatars or avatars attitude modes. In a particular implementation it is also possible to add sound to the avatar or different sounds to the different avatar modes, particularly describing different moods.

Particularly the telecommunication terminal is connected to a (web) server over a second connection (in addition to a first connection supporting speech) supporting communication of packet data for giving the end user access to at least a graphical communication and presentation service, e.g. comprising mobile avatars, (herein also called Mobile Avatar System Service MAS) which server handles set up of a conference call with one or more end users. Push/pull-technique is used for transmitting said at least visual/graphical customized information to parties of the call conference. Particularly the (web) server supports set up of a conference call including a plurality of users, and the customized visual/graphical (avatar) information of each of at least a number of participating users supporting such functionality is/are represented on the display means of all other participating users supporting the functionality (and active in the conference). Particularly, as referred to above, the customized visual/graphical (and possibly also sound) information, or avatar, of each end user can be altered to take a given number of attitude modes by its respective end user during the call conference. The attitude modes and the number of selectable modes are given by the respective end users for their proprietary customized visual/graphical (avatar) information.

Particularly the customized graphical information/avatars are added/removed as end users are connected to/disconnected from the conference call by the web server running the graphical presentation and communication application, particularly the mobile avatar system (MAS).

In another implementation the graphical information may comprise location information representing the physical position of the respective end users participating in the conference call on a map or similar. Said location information may be altered or updated continuously or at regular intervals. Connection to a positioning system is then presupposed. In a most particular implementation, the position of the end user, or of the avatar representing the end user, is illustrated as a blinking spot on a map. Alternatively the avatar of the respective end user may be illustrated on a map; even more particularly the avatars of all end user participating in the call conference may be indicated on the map. Any variation is in principle possible.

In order to allow for simultaneous communication of speech and data, i.e. allowing the end user to speech/listen at the same time as the graphical representation is available, a handsfree set is used to provide for the loudspeaker and the microphone functionality.

In one implementation the visual/graphical data information, particularly comprising an avatar, is stored in storing means in the terminal or on a SIM-card or a smart card or similar, which is detachably connected to the terminal. Alternatively, or additionally, the visual/graphical information comprises information which dynamically is fetched from Internet by the server running the application.

In a particular implementation a WAP-device is used or alternatively an EPOC-device is used. Also other devices can be used, as will be referred to below.

The first connection may be a circuit switched or a packet switched connection over a GSM, GPRS communication network or similar, but it may also be a fixed connection or a voice over IP-connection. Particularly the control means comprises one or more of a number of keys of the telecommunication terminal keypad, e.g. each one of said number of keys representing one avatar attitude mode (avatar mood) or similar. It is of course also possible to use telecommunication terminals provided with specific keys intended for such a functionality.

The invention therefore also discloses a system providing communication of speech and visual/graphical data information between communication terminals of which at least one is mobile, wherein the graphical/visual information data comprises at least customized visual/graphical information, and wherein the communication terminals comprise display means for displaying customized visual/graphical data information received from other terminals. Generally, of course, the already existing display of a mobile communication is used. The system comprises use of a first communication system for carrying speech connections between a number of (mobile) communication terminals, a packet data communication network, a server running an application/service (MAS, Mobile Avatar System) for customized representation of visual/graphical data information, e.g. avatars, and for setting up of a conference call between a number of mobile telecommunication terminals upon initiation by one of said telecommunication terminals for communication of said customized visual/graphical data information, particularly customized graphical characters, between telecommunication terminals. The customized visual/graphical data information, e.g. avatars, of an end user can be altered by the end user during an ongoing speech connection. Advantageously the telecommunication terminals support simultaneous communication of speech and data, and most advantageously they are so called GPRS class A-terminals. The inventive concept is however applicable on other kinds of terminals.

In one preferred implementation of the inventive concept the visual/graphical data information comprises customized avatars, whereby each telecommunication terminal comprises control means for end user control of the proprietary, customized avatar such that through activation of the control means by the end user, the proprietary avatar attitude can be changed.

Examples on such characters or avatar attitude modes are a smiling avatar, a crying avatar, a laughing avatar, a serious avatar, a waving avatar etc. Which attitude modes that should be available for a particular user is also selected/defined by the end user himself. Alternatively a set of already defined attitude modes can be selected.

Particularly the avatars of other/the end user terminals participating in the conference call are shown simultaneously on each respective telecommunication terminal, with the actual respective selected avatar attitudes. End user telecommunication terminals can be also be connected to/disconnected from the conference call, which as referred to above is handled by the server, and upon connection/disconnection, the respective customized visual/graphical data information, particularly the avatar, is added to/removed from the display means of the other telecommunication terminal(s) being parties to the conference call.

In one implementation customized visual/graphical data (avatar) information is fetched by the server means from the web. Proprietary, customized visual/graphical data information, e.g. avatar information, may also be stored in the respective telecommunication terminal or in storing means detachably provided with respect to the telecommunication unit, e.g. on a SIM-card or similar.

It is also provided for a method of transmitting customized visual/graphical data information from a mobile telecommunication terminal to a number of other, mobile or non-mobile, communication terminals, which comprises the steps of; setting up a data connection from the mobile telecommunication terminal to a server running an application for handling customized visual/graphical data information communication and representation; handling in the server set up of a conference call between transmitting mobile telecommunication terminal and one or more other selected or defined communication terminals; setting up a speech connection between parties of the conference call; using the speech connection for communication of speech; using the data connection for transfer and representation of customized visual/graphical data information in parallell with said speech connection.

Preferably the customized visual/graphical data information comprises customized avatar information, and the attitudes of the respective avatars can be changed by the respective end users during an ongoing speech connection. Customized avatars (or other visual/graphical data information), possibly also with audio information or sound, of all the other telecommunication terminals, or rather their end users, being parties of the conference call on each respective telecommunication terminal, while adding/removing avatars as end user telecommunication terminals become/cease to be parties of the conference call.

It is an advantage of the present invention that mobile communication terminals can be used for, particularly, entry of a virtual reality using avatars or similar information and particularly that it gets possible irrespectively of where an end user is located and particularly irrespectively of which terminal, and which type of terminal that is used. It is also an advantage, and makes the concept most attractive to different kinds of user groups, such as young people, that it is possible to change the attitude or mode of the avatar during an ongoing speech conversation, although this in principle presupposes the use of a handsfree set. It also gets exceedingly attractive in that it is possible to customize the avatars as well as their current attitudes or moods.

BRIEF DESCRIPTION OF THE DRAWINGS

The invention will in the following be further described in a non-limiting manner, and with reference to the accompanying drawings, in which.

DETAILED DESCRIPTION OF THE INVENTION

Figure 1:
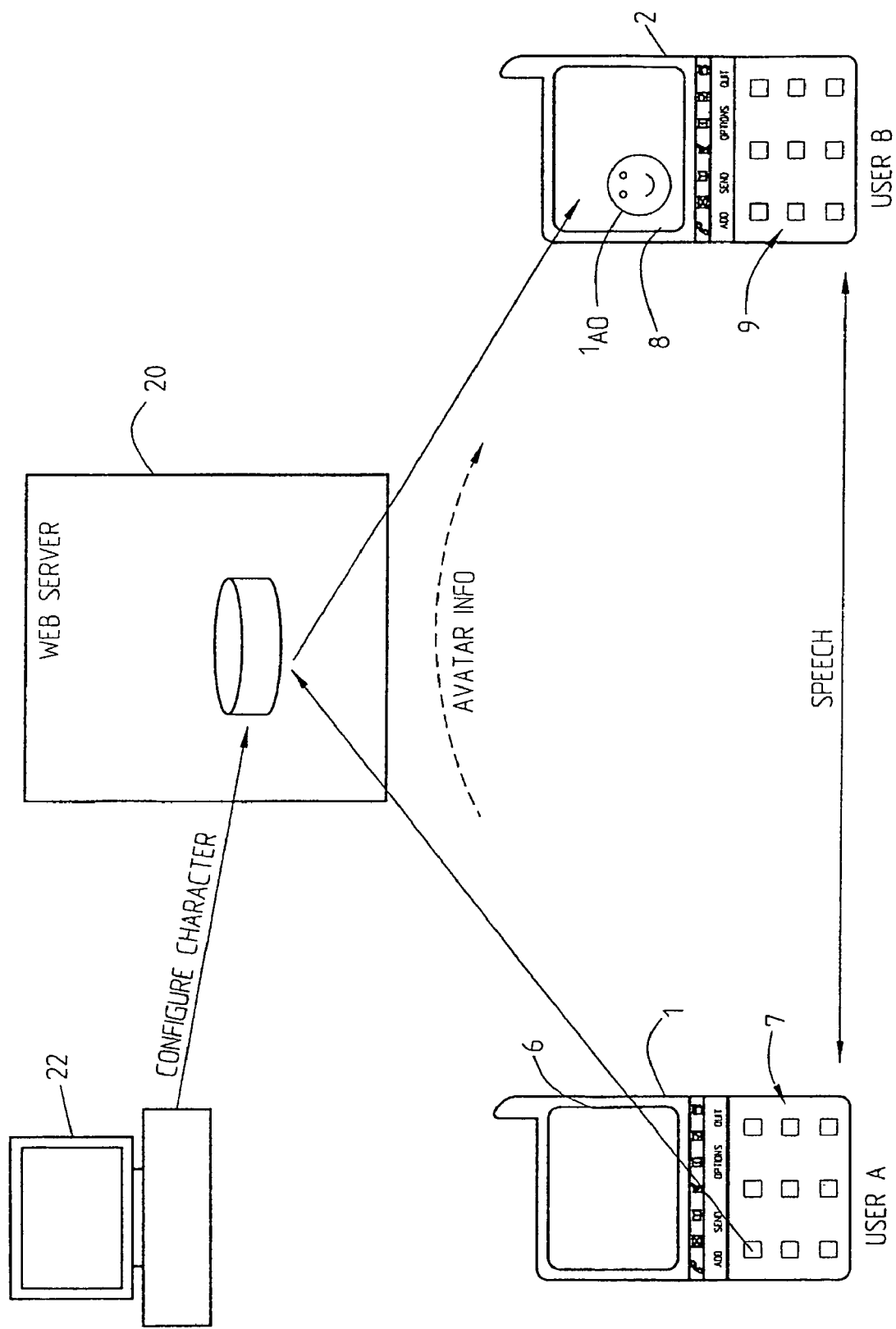
FIG. 1 schematically illustrates two mobile, telecommunication terminals, one of which initiates a communication comprising speech and avatar communication/representation.

According to the invention the first end user, here called end user A, uses a mobile communication terminal which is provided with the possibility to display a specific character on the mobile communication terminal, e.g. a WAP/EPOC terminal, of another end user, here called end user B, at the same time as a telephone conversation is going on between end users A and B. End user B will then see the specific character, or avatar, of end user A. However, the (target) terminal does of course not have to be WAP or EPOC-based, it may e.g. web-based, a pocket-PC, a proprietary client being run on a device etc. Also during conversation end user A can send commands to its avatar, e.g. making it smile, cry, winking, blushing, wondering etc. In other terms end user A is able to alter the attitude of the proprietary, customized avatar also when a telephone conversion is going on through activation of control means on the telephone keypad. End user B will then see the attitude end user A wants to show. Vice versa end user B can change the attitude of his personlized proprietary avatar (not shown). Particularly the character or the attitude (the mood) of the avatar changes (in the desired manner as its end user presses a key on the telephone keypad. In one implementation each key, of at least of a number of keys, have been configured by the end user. In an advantageous implementation configuration of avatar attitudes could be made available from a PC. In order to talk and look at the display at the same time, a handsfree set is generally required.

In a particular implementation, requiring somewhat more bandwidth, a character may comprise a face following the voice such that the lips move accordingly. Characters, or specifically avatars, may for example be fetched from a library available on the network. Alternatively a tool kit or similar could be used for the creation of new, personalized characters. In a particular implementation a group mode could be implemented to allow several users to be connected at the same time in a telephone conference, whereby all or some of them could be, at the same time, present on the respective communication terminal displays or screens through presentation of the respective customized characters or avatars. The implementation of the concept according to the invention can be varied in a number of ways and particularly the product of the application could be multi-terminal compatible, e.g. for PCs, screen phones, PDA (Personal Digital Assistant) with wireless communication, mobile telephones, fixed telephones etc.

In a particular implementation it could be possible to add sounds to be introduced to the other parties of the conversation with the animation, sounds that could be predefined or downloaded from the web or even end user created sounds. In still an advantageous implementation it could be provided for a possibility to add a selectable chat mode.

The representation as such of visual/graphical data information, such as for example a character or even more particularly an avatar, could be done in many different ways and for example it could be possible to limit the time when the character etc. is shown on the display of others participating in the conversation. The character could for example be displayed only at the beginning of a telephone conversation, it could be added to a number presentation facility or to a name or subscriber presentation facility, it could occur at regular time intervals, or it may be programmed to disappear after a given time interval or appear after a given time interval etc.

If for example an end user has activated an answering machine, a dedicated character or avatar configured by the end user could appear on the display of the communication terminal of another, initiating, end user, or on the terminals of the other end users of the group contacted by the initiating end user.

In a most particular implementation the visual/graphical data information comprises a map which is shown and on which it is indicated where (on the map) the end user currently is, e.g. in that a blinking spot or similar is animated to indicate the movement of the end user. This presupposes a connection to a localization system. It could also be possible to have the avatar of an end user moving on the map, such that all the other end users can see where the other end users are by the respective customized avatars being illustrated on the map.

According to one implementation a WAP-device is used (Wireless Application Protocol).

In the following the inventive concept will be described with reference to the figures.

FIG. 1 shows a mobile telecommunication terminal 1 used by end user A, which comprises display means 6 and a number of keys 7. End user A here intends to communicate with end user B using a mobile communication terminal 2 with display means 8 and keys 9. Here is supposed that end user A via PC 22 has accessed a web-server 20 to configure the customized, proprietary avatar $1_{AO}$ of user A. For access of an application, here called mobile avatar service (Mobile Avatar System MAS), the mobile communication terminal 1 logs on and accesses the web-server 20 for set up of e.g. an ISP, a PPP or a GPRS connection and via the appropriate URL (Uniform Resource Locator) the Mobile Avatar Service (MAS) is accessed. It is supposed that a list of end users have been indicated by end user A which should be available for communication using the MAS. It is possible for end user A to select one or more, or all, of the other indicated end users. The MAS then handles the set up of a packet data connection with the other end user(s) which should take part by setting up a conference call. If, as in the embodiment of FIG. 1, only one end user is selected, in this case end user B with communication terminal 2, who is not connected or has not logged on, in one implementation the web-server 20 sends an SMS (Short Message Service) to the mobile communication terminal 2 which then may log on. By the web-server a speech connection is also set up between communication terminals 1 and 2 over a conventional telecommunication network, e.g. GSM, UMTS, GPRS, a fixed network or voice over IP. As soon as end user B logs on, the avatar as previously configured by end user A is transferred over the data communication network from the web-server 20 to the mobile communication terminal 2 of end user B and the customized avatar of end user A, $1_{AO}$, will appear on the display means 8 of mobile communication terminal 2.

During the established conversation end user A may at any time change the attitude or character mode (mood) of his avatar by activating the configured keys on the telecommunication terminal 1, which means that the mobile avatar web system MAS updates or alters the avatar representing end user A to be shown on the display means of end user B. The SMS messages sent to end user B (if implemented) could for example contain the telephone number that should be dialed by end user B for entering the conference mode established by the web-server 20 or by the mobile avatar system. Alternatively end user B simply confirms that he wants to participate and be a party of the conference call. This can be done in many different ways. If end user B already is logged on, the avatar of end user A will appear on his display as soon as the data connection has been established by MAS. (As the connection has been established the avatar of user B will appear on the display of user A's terminal.

Figure 2:
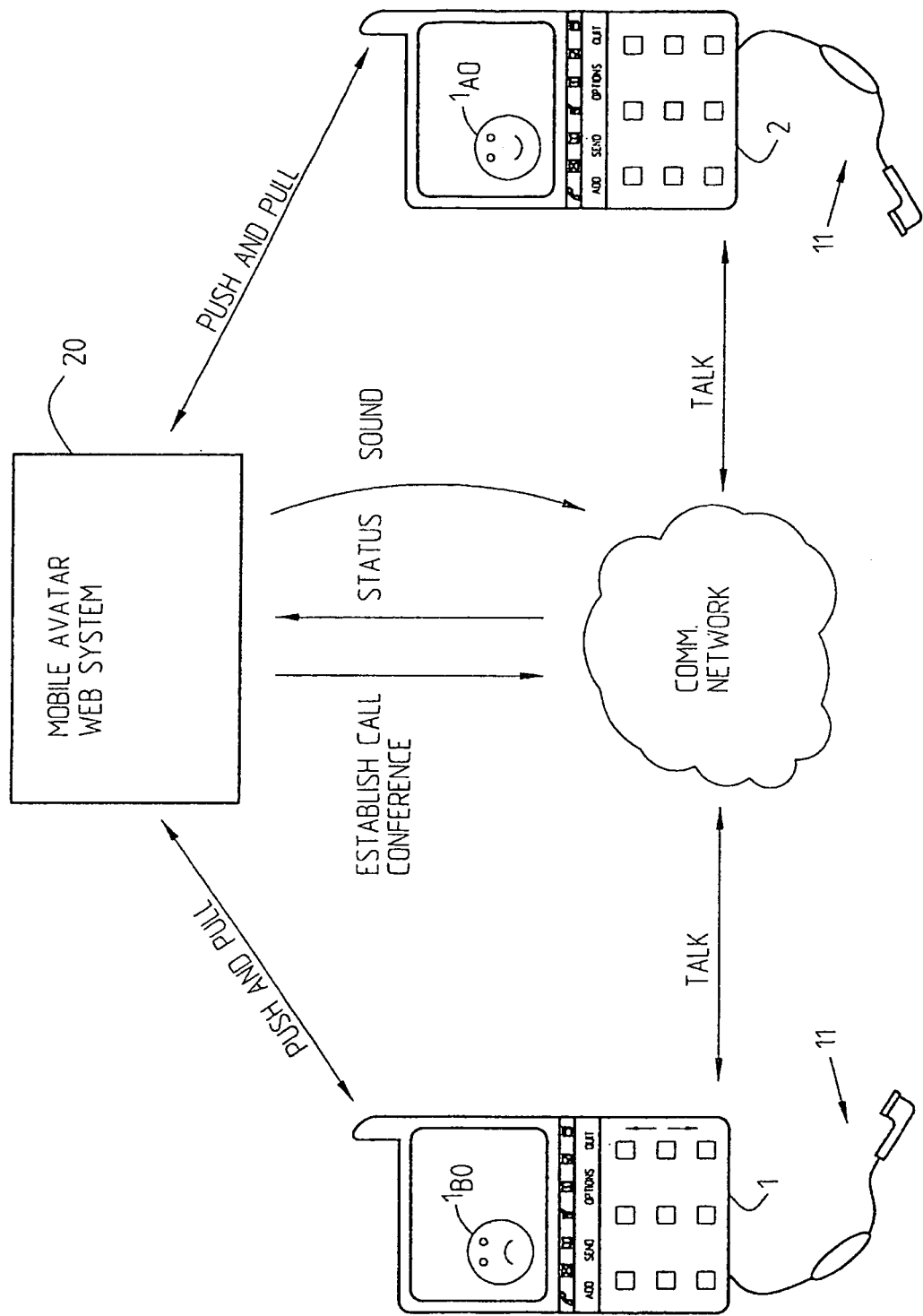
FIG. 2 is a figure similar to FIG. 1 illustrating somewhat more in detail communication of speech and avatar information between two telecommunication terminals.

FIG. 2 is a figure similar to that of FIG. 1 illustrating mobile communication terminals 1 and 2 each provided with a handsfree set 11 during communication via a classical infrastructure communication network for speech, GSM, GPRS/UMTS, fixed network, voice over IP etc. and over a data communication network through access of the mobile avatar web-system 20 supporting data presentation and communication facilities and wherein the mobile avatar web-system has established a conference call between mobile communication terminals 1 and 2.

Generally all calls are initiated in a conference mode by the web-server 20 and then hyperlink click and push facilities and dynamic generation of web-pages can be implemented. The server may send sounds like regular subscriber inside the conference call, for which one or more channel(s) is/are taken. Software modules that could be used by a system providing mobile avatar functionality are End User Configurator (Draw, Forum, Global Library, My Library), Web Page Generator (Adaptation to all Mobile Screens, Push/Pull Mechanism), Conference Call Mechanism and Updates (Interface Parlay INCS1+/2) etc.

Figure 3:
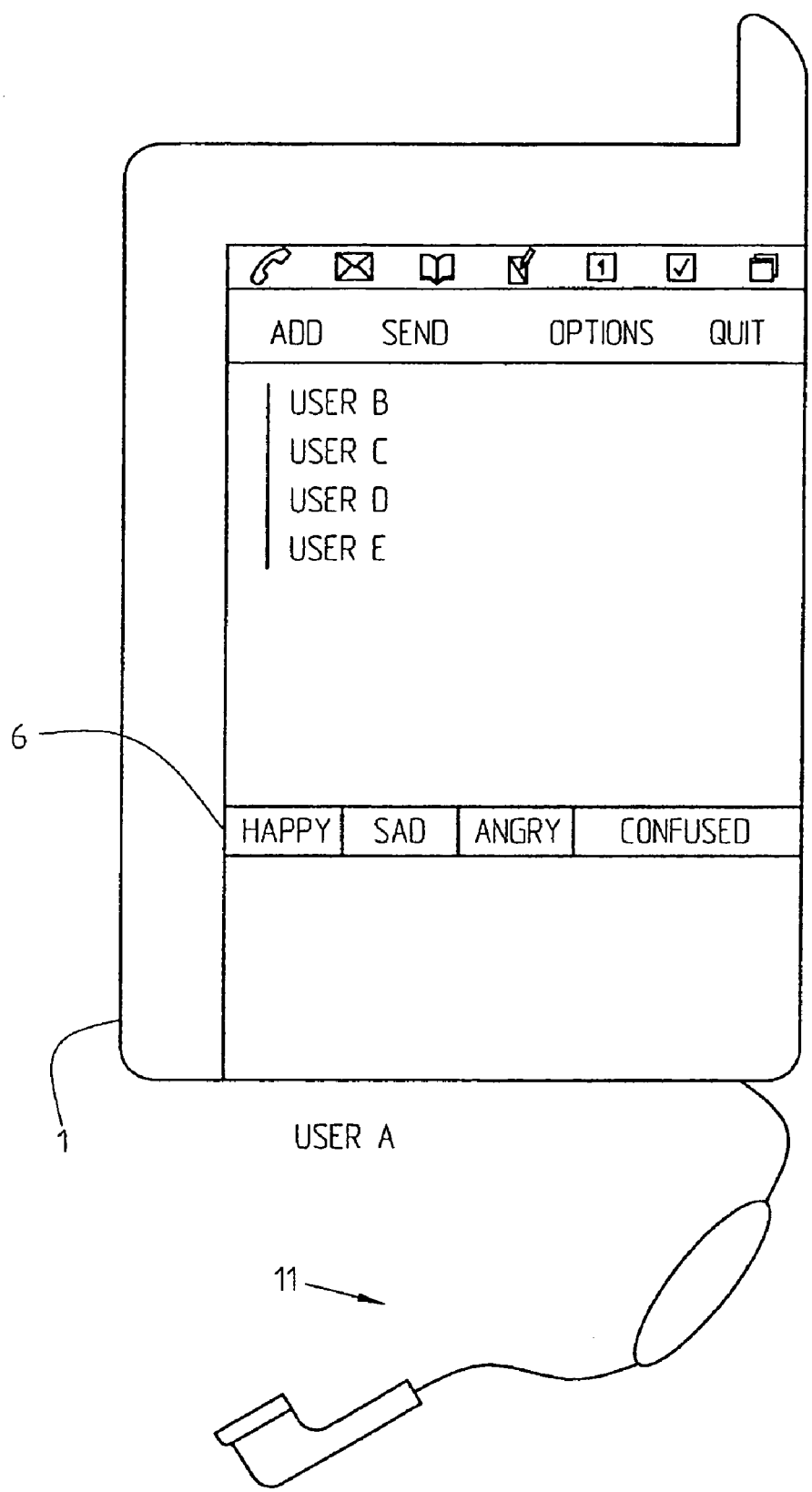
FIG. 3 illustrates a telecommunication terminal initiating a communication with a plurality of parties including transmission of avatar information.
Figure 4:
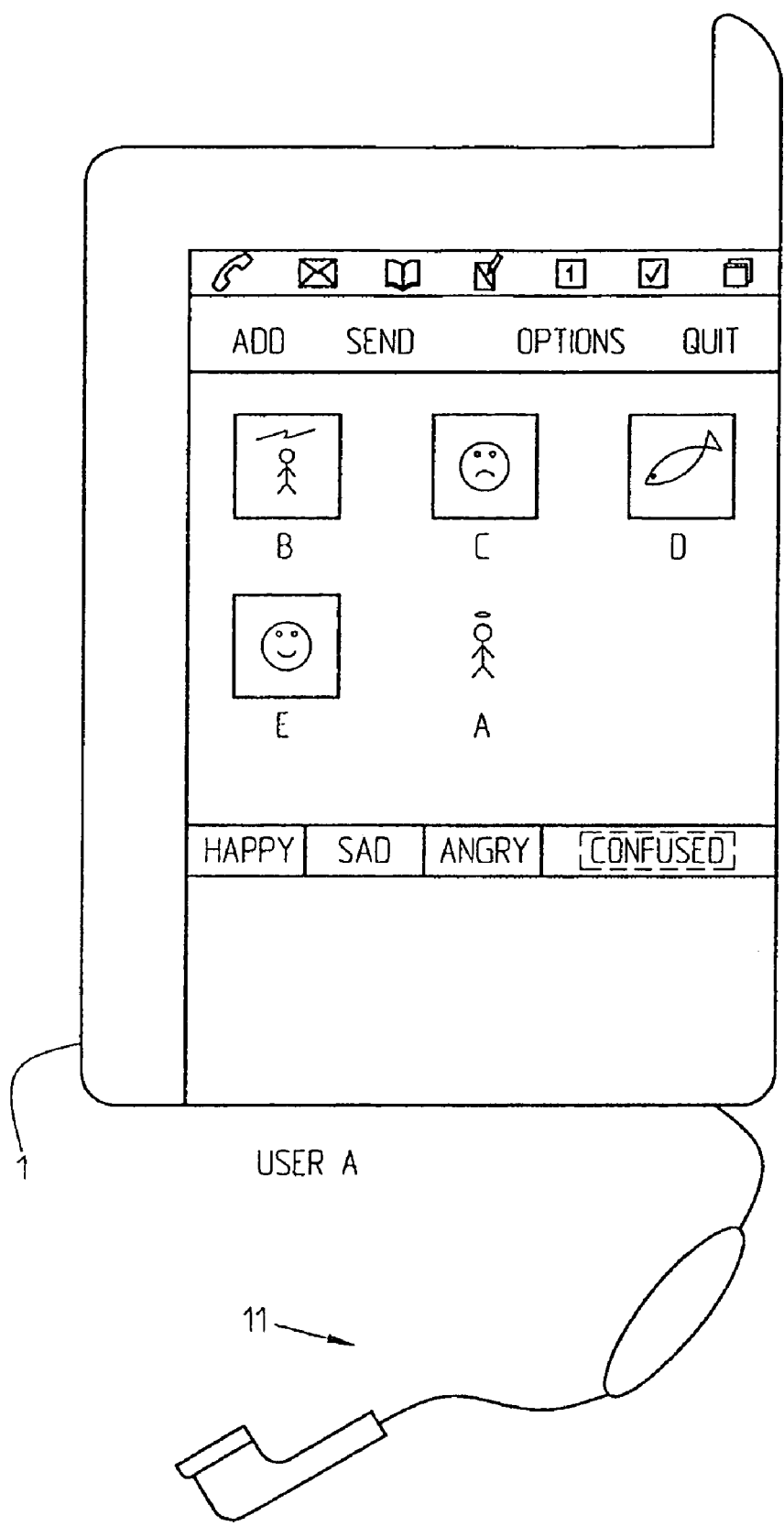
FIG. 4 illustrates an example of the display of user A during communication between multiple parties as in FIG. 3.

FIG. 3 schematically illustrates a mobile telecommunication terminal 1, here the terminal used by end user A, to which a handsfree set 11 is connected. It is here also supposed that end user A initiates a speech and avatar communication. In the server end user A has defined a group of members that should be available. It is supposed that the user A has accessed the mobile application service MAS and has indicated that he intends to communicate with a group. By selection of "ADD", the list of members of the group will appear on the display. End user A is then able to select one or more of end user B, C, D, E. When this has been done, everyone can be reached by the mobile avatar system. Depending on whether they are logged on or upon affirmative response to an indication by the mobile avatar system, the server will set up a conference call with end users B, C, D, E. They can then speak with each other and with end user A and the respective customized avatars of the end users will appear on the screens or display means of the terminals of the end users as illustrated in FIG. 4.

It is here supposed that end user B is represented by an angry avatar attitude, end user C by a sad avatar attitude, end user D by a fish, and end user E by a smiling avatar. It is here supposed that the avatar of end user A, also is indicated on the display of the terminal of user A, this is however not necessary, the interesting feature being that the avatars of the other parties of the conference are shown on the display means of end user A, and vice versa for the other parties. During the conversation end user A can select and alter the kind of attitude his avatar should have. Particularly the current attitude mode is highlighted, here "confused". The avatars of end users A, B, C, D, E appear only as long as the respective end users are connected, and thus, if an end user is disconnected, his customized avatar will disappear and correspondingly, as an end user logs on to the MAS, his avatar will appear on the display means of the others. It should be clear that in FIGS. 3, 4 only one simplified example is illustrated. By selecting QUIT, end user A may leave the conversation. It is also possible to select SOUND during the conversation to additionally transfer sound effects to the other parties of the conversation. Different sounds can be configured for different keys, and by pressing a key, the selected sound will be transferred by the web server (i.e. MAS). This is however an optional feature.

Access of MAS is generally provided through access of a portal. When referring to a portal, it is generally meant an Internet portal. There is an increasing need to personalize or customize the way an end user can access services irrespectively of the actual location of the services or applications. At the same time the demand for access to mobile Internet services increases, i.e. which means that the end users need to be able to, in a rapid and uncomplicated manner, get access to services from any, or any type of, end user station, in other terms also from mobile devices. It may relate to sending and a receiving e-mails, short messages and accessing web-based information from mobile as well as from fixed end user terminals in a user-friendly manner, which is called the mobile Internet. Browsing using the mobile terminals is more difficult than browsing using a PC, since the mobile terminal, as compared to the PC, has limited input and output capabilities. It therefore gets more difficult to provide mobile end users with a satisfactory personalization, customization and management of services. A portal can be said to be a doorway to the content of services and applications (e.g. MAS), preferably it should be tailored to meet the requirements of the respective end users. Examples of portal content are information services, particularly including push content, which is an Internet technique through which all information a user subscribes to, or information that the service provider or operator means that the user should be provided with, automatically is "pushed" or provided to the end user. So far many applications are in principle exclusively designed for the 2G telecommunications environment. Applications developed for the Internet (Internet Protocol) environment have to a large extent been based on established and open de facto standards supporting extensive integration of different applications.

Through the introduction of 3G networks (3GPP) future applications will contain a mixture of telecommunication and data communication services, mixing higher and lower bit rates as well as real time and non-real time traffic. A mobile portal or a mobile portal structure allows access by mobile end user terminals. The Swedish patent application "An arrangement and a method relating to access of applications/services", filed on Jan. 24, 2001 by the same applicant as the present invention describes a portal structure which allows user personalization and customization and supports mobile as well as fixed station access. The content of this application is herewith incorporated herein by reference. The portal structure disclosed herein integrates Internet and WAP based services such that access is enabled from any Internet connected PC, WAP-device or any other mobile terminal using a mobile access network, e.g. GSM, GPRS, WCDMA (Wideband Code Division Multiple Access), UMTS (Universal Mobile Telecommunications), SMS (Short Message Service), broadband also allowing access by PDAs (Personal Digital Assistant), i.e. techonology independent access is supported.

By a portal is generally meant a non-physical entity in the Internet domain which can be described as an "electronic publishing space" which is owned by an individual or an organization and which provides either direct access to information and services or links to other entities in the Internet or in private intranet domains providing information and services to authorized end users. In its simplest form portal is a regular homepage or list of links. In more advanced forms it may offer interactive services.

Wireless end users are given access through a "service" portal. Such a "service" portal is different from a traditional fixed Internet portal for PCs, and end users demand personalized services delivered to and presented on their mobile terminals at least as an option.

It is thus supposed, in this application, that an end user accesses the mobile avatar service application or system through a portal, particularly a mobile portal.

Different implementations of the inventive concept are possible depending on used or available communication systems and applicable standards. In a most simple implementation it is possible to use GSM and SMS. According to GSM V1.0 it is possible to predefine a group, in this document also called "a tribe". The end user has to define when he subscribe to the service, i.e. the mobile avatar service. The subscription can be changed through a web-access. An audio conference can be initiated through SMS in that an empty SMS is sent to the server handling the mobile avatar service. The server then sends an SMS containing group and phone number to every member of the group. Every group member wanting to join the group conference clicks phone number to join the group or tribe, e.g. everyone may dial up. In a somewhat more advanced implementation there may be several groups defined or given for one user. In a particular implementation based on version V1.2 a group SMS is sent which is received by every group member.

Another implementation is based on using a GSM/GPRS class B terminal and WAP based on the V1 2.0 version. A group membership can be defined and modified via phone. An audio conference may be initiated through WAP on the portal through which the end user accesses the service. When the end user selects group or tribe, a list of names or nick names of the members of the group are shown and the application server sends an SMS or pushes the group and phone number through WAP. Every group number then receives the SMS/WAP. To start up the function, everyone clicks the phone number or dials up. Using version 2.2, everyone will be connected and chatting with icons representing each group member and their moods as selected by the respective group members, i.e. the parties of the conference.

In the most advantageous implementation a GPRS class A terminal is used over UMTS, EDGE. Particularly this is based on version V3.0. An audio conference is particularly initiated through WAP in that it gets possible to monitor and play with icons. They can also be in different colors and be animated as referred to above. In a particular implementation it is possible to also add different kinds of sounds, and surfing and audio conference is available at the same time. In a most particular implementation connection to a positioning system is provided through which it gets possible to indicate the position of all group members. In a most advantageous implementation a multimedia messaging system is integrated.

Figure 5:
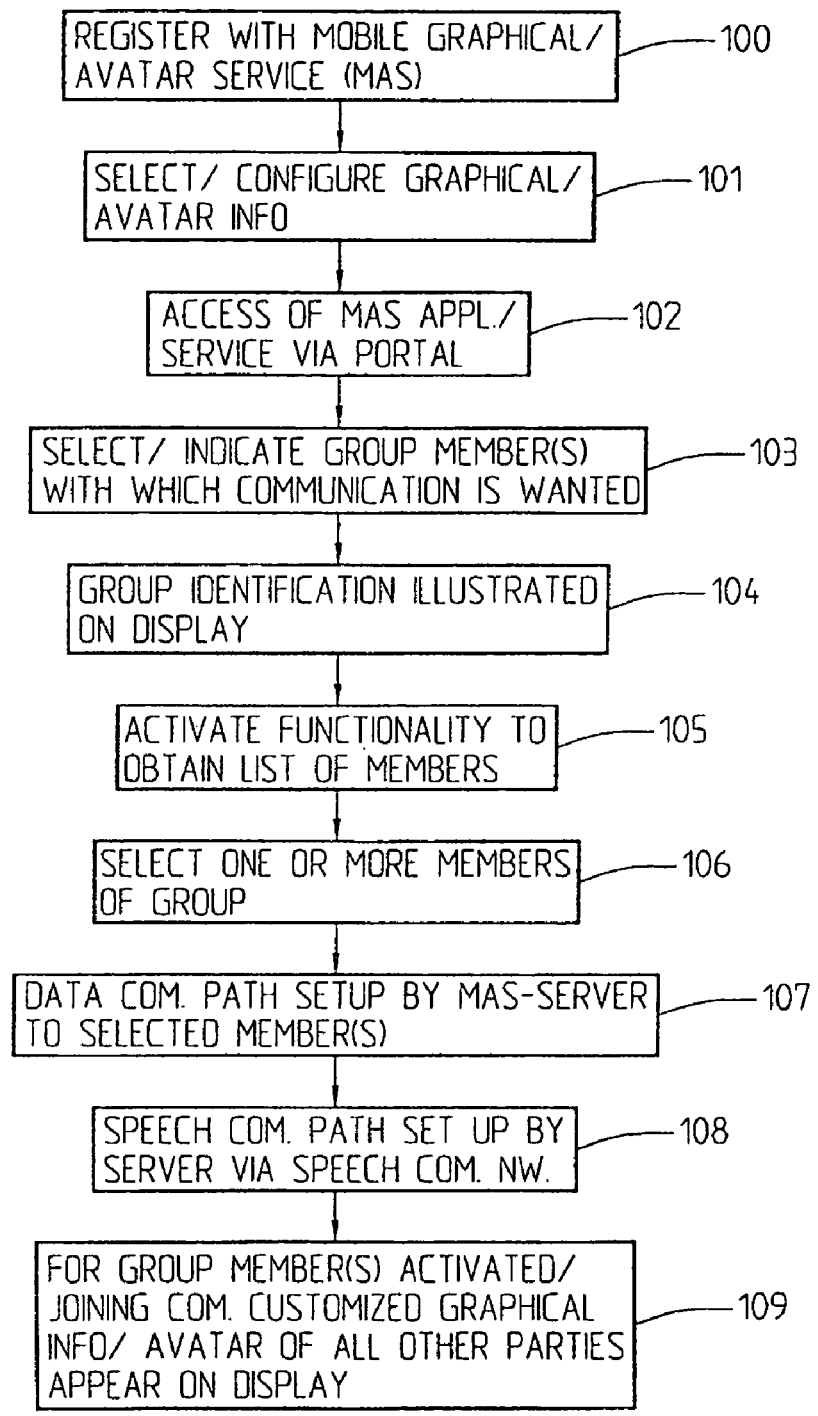
FIG. 5 is a flow diagram illustrating initiation of a communication between several parties including transmission of avatars.

FIG. 5 is a simplified flow diagram describing an end user who wants to implement and initiate a mobile graphical/avatar service. First of all the end user has to register with the mobile graphical/avatar service denoted Mobile Avatar System, MAS, 100, which includes registering with the service or application as such and further means that the end user has to select and/or configure customized graphical information, or particularly avatar information, which the user wants should represent himself in communication with other selected users with which he wants to communicate, 101. This is not described in any detailed manner with reference to this figure, since in FIG. 6 it is somewhat more thoroughly given an example on how the customized graphical information or avatar information can be configured from a PC accessing the MAS server. However, supposing that the end user is registered with such a service and that he has configured his avatar (for example), the end user may at any time access the MAS application/service via a portal, 102, and select/indicate with which group member(s) communication is wanted, 103. According to different implementations he may have defined different groups. Then one group is selected. In this particular implementation, the group identification is illustrated on the display of the initiating end user, 104, supposing he has selected one of the groups. The end user then activates a functionality to obtain a list of the group members, 105, and once the list of members is visible on the display, he selects one or more members of that particular group, 106, with which he wants to establish a communication by means of speech and graphical (avatar) information, 106. When this has be done, a communication path is set up by the MAS server to the selected member(s), 107. A speech communication path is then set up by the server over the speech communication network, 108, e.g. GSM, GPRS etc. as referred to above.

The information about which members that should be invited, is normally contained in a HTTP (Hypertext Transfer Protocol) request sent by the end user to the web-server to provide the MAS with information about which other users that should be contacted. If these other end users are not logged on, an SMS message may be sent (unless a class A terminal is used in which this is superfluous). If on the other hand they are already logged on, a notification is sent with push information to the embedded service, and possibly the specific costumized avatar information of the initiating end user. Normally a session is initiated only if the "target" end user has accepted the communication. When two or more end users of the group are in contact, i.e. contact has been established to the telecommunication network, it is possible to activate the voice session over the speech network e.g. by clicking on a key/link. This means that the web-server will be informed and it contacts the mobile telecommunication network and then a number may be given. Particularly the MAS application handles the numbering service, and numbers can be given to indicate how to get to the conference bridge. This can be done in different manners. A number may be given by MAS as a response to a HTTP request sent by the end user or a HTTP push that informs the end users about which number to call. Alternatively the end user may be requested to confirm (deny) that he wants to join the voice conference or not.

Thus, for all activated or joining group members, i.e. parties, the customized graphical information/avatar information of the other activated parties will appear on the display. When an end user wants to change the attitude mode (mood) of his graphical information/avatar, information is provided to MAS in a HTTP request indicating which mode should be used currently. For example one particular mood (sad, happy, angry etc.) may be selected. The MAS then sends out a push message to the other parties. As referred to above, in a particular implementation sound may also be added. It should be clear that this can be done in many different ways, e.g. more or less automatically, requiring more or less user intervention, etc. automatic set up of a data session and a voice session etc., the user only indicating which other users should be contacted, which character mode should be used (unless a default mode already is given) and altering the mode when so is wanted, the main thing being that voice and push is enabled the same time.

Figure 6:
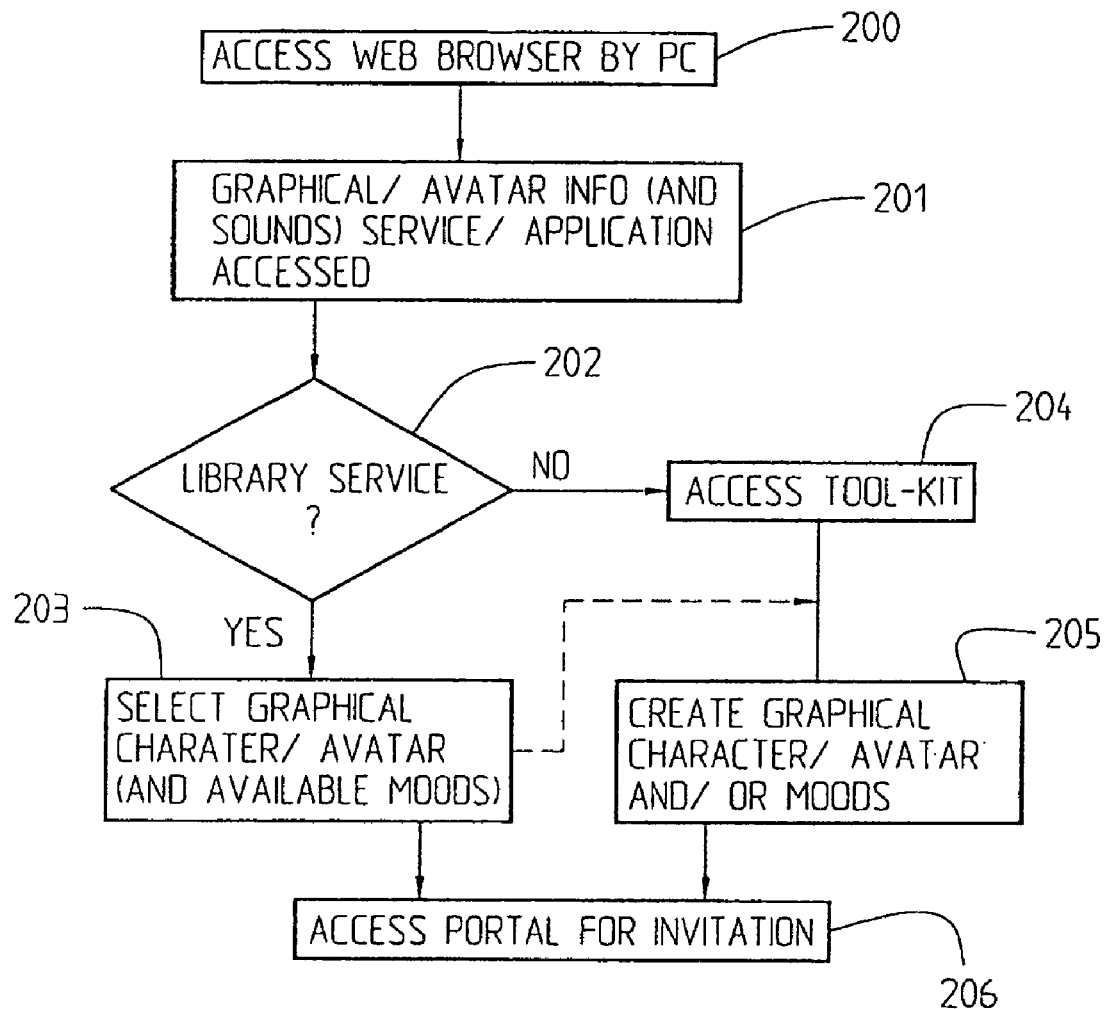
FIG. 6 is a flow diagram illustrating the basic steps for configuration of a customized avatar of an end user.

FIG. 6 is a very simplified illustration in the form of a flow of how configuration could take place. It is supposed that the end user accesses a web browser by PC, 200. Then the graphical/avatar information (and sounds) service/application MAS is accessed, 201. Then there is an option to select library service if wanted, 202. If yes, a graphical character/avatar (and possibly including the available modes), is selected, 203. If however, the end user does not want to use the library service, he accesses the tool kit, 204. By means of said tool kit, the end user can create his proprietary, customzied graphical information as character/avatar and/or modes that should be available, 205. Irrespectively of whether the graphical information is selected from the library or if it is user created, the end user may, at any later stage, access the portal for initiation of the service, 206, for communication with other end users as discussed above. In one implementation, if a graphical character or an avatar is selected by use of the library service, it may still be possible to create e.g. moods for that predefined character as indicated by the dashed line from box 203 in the figure.

If the end user wants to indicate his position on a map (and to obtain information about the other contacted parties), graphical information in the form of a map may be selected, and contact is established with a positioning system, and a blinking spot may indicate the position of the respective end users. Such a functionality may also be combined with the customized avatars in that the respective customized avatars are indicated on a map shown on the displays of all contacted and participating members.

It should be clear that the invention can be varied in a number of ways without departing from the scope of the appended claims, and it is by no means limited to the embodiments specifically illustrated herein.

The invention claimed is:

1. A mobile telecommunication terminal comprising:
    display means for displaying avatar information;
    loudspeaker and microphone means for communication with other telecommunication terminals over a first connection supporting communication of speech,
    means for supporting transmission to, and representation of, proprietary customized avatar information, on other telecommunication terminals, as well as representation on the mobile telecommunication terminal display means of customized avatar information received from said other telecommunication terminals, wherein the mobile telecommunication terminal comprises control means for altering or updating the proprietary customized avatar information during an ongoing speech connection with one more of said other telecommunication terminals over said first connection;
    means for selecting customized or predefined avatar/avatar attitude modes, wherein the telecommunication terminal is connected to a web server over a second connection supporting communication of packet data for giving the end user access to a Mobile Avatar Service (MAS), comprising mobile avatars, said server handling set up of a conference call with one or more end users, and a push-pull technique is used for transmitting said mobile avatars to parties of the call conference; and
    means for performing simultaneous communication of speech and data.

2. The mobile telecommunication terminal according to claim 1, wherein said telecommunication terminal is a GPRS class A terminal.

3. The mobile telecommunication terminal according to claim 1, wherein the server supports set up of a conference call including a plurality of users, and the customized avatar information of each participating user is represented on the display means of all other participating users supporting such functionality and being parties of the conference call, and the avatar information, of each party can be altered, to take any of a given number of attitude modes by its respective end user during the call conference, wherein the attitude modes and the number of selectable modes are predefined by the respective end users for their proprietary avatar information.

4. The mobile telecommunication terminal according to claim 3, wherein customized avatar information is added or removed as end users are connected to or disconnected from the conference call by the web server providing the Mobile Avatar Service.

5. The mobile telecommunication terminal according to claim 4, wherein the avatar information comprises location information representing the physical position of the respective end users participating in the conference call on a map or similar, said location information being altered and updated continuously or at regular intervals, automatically or by the respective end user.

6. The mobile telecommunication terminal according to claim 5, wherein the loudspeaker and microphone means comprise a hands free set.

7. The mobile telecommunication terminal according to claim 6, wherein the customized proprietary avatar information is stored in storing means in the terminal or on a SIM-card, smart card or similar, detachably connected to the terminal.

8. The mobile telecommunication terminal according to claim 6, wherein the avatar information is dynamically fetched from the Internet by the server.

9. The mobile telecommunication terminal according to claim 8, wherein the telecommunication terminal is a WAP-device or an EPOC-device.

10. The mobile telecommunication terminal according to claim 9, wherein the first connection is a circuit switched or a packet switched connection over GSM, GPRS, a fixed connection or a voice over IP-connection.

11. The mobile telecommunication terminal according to claim 10, wherein the control means comprises one or more of a number of keys of the telecommunication terminal keypad.

12. A system for providing communication of speech and avatar information between telecommunication terminals of which at least one is mobile wherein the avatar information comprises proprietary end user customized characters, wherein the mobile telecommunication terminals comprise display means for displaying customized avatar information received from other terminals, the system for providing communication of speech and avatar information comprising:
   a first communication system for carrying speech connections between a number of mobile telecommunication terminals and a
   a packet data telecommunication system, wherein both the first communication system and the packet data communication system are coupled with
   a server running an application for customized avatar information, wherein the server handles set up of a conference call between a number of mobile telecommunication terminals upon initiation by one of said telecommunication terminals for transfer of the customized avatar information between telecommunication terminals wherein the proprietary avatar information of an end user, can be altered by the end user during an ongoing speech connection, and the telecommunication terminals comprise
      control means for end user control and alteration of the proprietary customized avatar information and
      means for supporting simultaneous communication of speech and data.

13. The system according to claim 12, wherein the telecommunication terminals are GPRS class A-terminals.

14. The system according to claim 13, wherein each end user can select between a number of different attitude modes of the proprietary customized avatar information, and the avatar information of the telecommunication terminals participating in the conference call is shown simultaneously on each respective telecommunication terminal, with the actual respective selected avatar attitudes.

15. The system according to claim 14 wherein the telecommunication terminals can be connected to and disconnected from the conference call, and upon connection or disconnection the respective avatar information, is added to or removed from the display means of the other telecommunication terminals participating in the conference call.

16. The system according to claim 15 wherein the avatar information is fetched by the server means from the web.

17. The system according to claim 14, wherein the proprietary, customized avatar information, is stored in the respective telecommunication terminal or in storing means detachably provided with respect to the telecommunication terminal, on a SIM-card or similar.

18. A method of transmitting customized avatar information from a mobile telecommunication terminal to a number of other mobile or non-mobile telecommunication terminals, wherein the telecommunication terminals support simultaneous communication of speech and data, and the method comprises the steps of:
   setting up a data connection from the mobile telecommunication terminal to a server running an application/service for handling customized avatar information representation and communication,
   handling in the server set up of a conference call between a transmitting mobile telecommunication terminal and one or more other telecommunication terminals,
   setting up a speech connection between parties of the conference call,
   using the speech connection for communication of speech,
   using the data connection for communication and representation of avatar information in parallel with said speech connection wherein attitudes of the respective avatars can be changed during an ongoing connection by end users of the respective telecommunication terminals; and
   displaying all customized avatars of all the other telecommunication terminals on each telecommunication terminal while adding or removing avatars as telecommunication terminals connect to or disconnect from the conference call.

* * * * *

UNITED STATES PATENT AND TRADEMARK OFFICE
CERTIFICATE OF CORRECTION

PATENT NO.         : 7,231,205 B2  
APPLICATION NO. : 10/484534  
DATED              : June 12, 2007  
INVENTOR(S)       : Guyot et al.

Page 1 of 1

It is certified that error appears in the above-identified patent and that said Letters Patent is hereby corrected as shown below:

In Column 13, Line 58, in Claim 12, after "and" delete "a".

Signed and Sealed this

First Day of April, 2008

JON W. DUDAS  
*Director of the United States Patent and Trademark Office*